United States Patent [19]

Fujitani et al.

[11] Patent Number: 4,891,567
[45] Date of Patent: Jan. 2, 1990

[54] BRUSHLESS DC MOTOR HAVING AN OUTER ROTOR

[75] Inventors: Sakae Fujitani; Yuzuru Suzuki; Masanao Okuda; Hitoshi Takahashi; Junichiro Fukazawa, all of Shizuoka, Japan

[73] Assignee: Minebea Co., Ltd., Nagano, Japan

[21] Appl. No.: 217,570

[22] Filed: Jul. 12, 1988

[30] Foreign Application Priority Data

Jul. 16, 1987 [JP] Japan ................................ 62-177399
Jan. 30, 1988 [JP] Japan ................................ 63-20043
Feb. 6, 1988 [JP] Japan ................................ 63-26335
Apr. 25, 1988 [JP] Japan ................................ 63-101653

[51] Int. Cl.$^4$ .......................................... H02K 29/06
[52] U.S. Cl. .................................. 318/254; 318/138; 310/68 R
[58] Field of Search .................. 318/138, 254, 439; 310/68 R

[56] References Cited

U.S. PATENT DOCUMENTS

| | | | |
|---|---|---|---|
| 2,861,204 | 11/1958 | Bauer | 318/254 X |
| 3,402,337 | 9/1968 | Malmborg et al. | 318/254 |
| 3,497,782 | 2/1970 | Petrides | 318/254 |
| 3,569,804 | 3/1971 | Studer | 318/254 X |
| 3,806,785 | 4/1974 | De Valroger et al. | 318/254 |
| 3,922,590 | 11/1975 | Warren et al. | 318/254 X |
| 4,028,568 | 6/1977 | Tatsumi et al. | 310/68 R X |
| 4,385,249 | 5/1983 | Fukushima | 310/68 R |
| 4,600,864 | 7/1986 | Sato | 318/254 |
| 4,656,377 | 4/1987 | Akiyama et al. | 310/68 R |

Primary Examiner—Bentsu Ro
Attorney, Agent, or Firm—Oliff & Berridge

[57] ABSTRACT

Herein disclosed is a brushless DC motor of high performance, which has its construction simplified and feasible made by sandwiching an annular coil between two stator yokes having a plurality of magnetic elements in the circumferential direction, by magnetically shorting the two stator yokes through a shorting member, and by providing a magnetic pole detector for detecting the positions of the magnetic poles of a rotor.

20 Claims, 14 Drawing Sheets

BRUSHLESS DC MOTOR HAVING AN OUTER ROTOR

BACKGROUND OF THE INVENTION

1. Field of the Invention

The present invention relates to a brushless DC motor arranged with a permanent magnet rotor having a multiplicity of poles magnetized on its outer circumference.

2. Description of the Prior Art

The stator structure of the brushless DC motor is divided into cored and coreless types. The cored type stator is constructed by laminating a number of electromagnetic steel plates punched into a predetermined shape and by winding the slot portion of the stator. For this winding, the slot is insulated on its inner surface and is divided.

The stator of this cored type must have its slot divided before it is wound, therefor its winding works are complicated and raise the production cost.

On the contrary, the coreless stator is advantageous in respect of the winding works but naturally has a worse efficiency in the magnetic circuit because of lack of the core. In order to realize the desired motor performance, therefore, a permanent magnet of high performance is required which raises the production cost.

SUMMARY OF THE INVENTION

An object of the present invention is to provide a brushless DC motor of high performance, which has a simplified construction and is easier to assemble by improving the above-specified defects of the prior art, i.e., the complicated winding works of the laminated cored type stator or the poor efficiency of the coreless magnetic circuit.

According to the present invention, there is provided a brushless DC motor comprising a rotor borne rotatably in a bearing housing and formed with a plurality of magnetic poles in the rotating direction; a stator spaced through an air gap from said rotor for generating a magnetic field which acts upon the magnetic poles of said rotor when fed with an electric current; and a magnetic pole detector for detecting the positions of the magnetic poles of said rotor to control the electric current to be fed to said stator. Furthermore, the stator includes: an annular coil wound on a bobbin for passing said electric current therethrough; and two stator yokes made of a magnetic material and each having magnetic elements in a number half as many as that of the magnetic poles of said rotor, said stator yokes being arranged to face each other at their magnetic element forming sides through said annular coil, said magnetic elements being combined with each other so as to establish a magnetic unbalance in said air gap with respect to the magnetic poles of said rotor and being magnetically shorted through a shorting member.

The stator yokes may be made of a ferromagnetic material or a soft, magnetic material. The leakage flux is reduced by using the ferromagnetic material. Moreover, the ferromagnetic material may be a metal or a plastic ferrite.

The stator yokes can be made by pressing a plate of a magnetic material. The coil has a simple annular shape and may be sandwiched between the stator yokes from its two sides after it has been completed. Thus, the coil can be remarkably simply wound by using an automatic winding machine.

Each of the two stator yokes sandwiching the coil has its magnetic elements arranged on a circumference to face the rotor magnets thereby to form an air gap. The rotor can be continuously rotated by detecting the locations of the rotor magnets with a magnetic pole, detector and by energizing the coil with the appropriate timing.

In the present invention, the stator yokes and the bobbin of the annular coil may have holes and projections in corresponding positions. The projections can be easily fitted for positioning and fixed by a thermal caulking. As a result, the assembly can be automated while facilitating the handling of the parts.

On the other hand, the shorting member may be cylindrical members. These cylindrical members are disposed in the inner circumferences of the two stator yokes at the sides formed with the magnetic elements and are fitted one in the other. Thus, the two stator yokes can be simply assembled and magnetically integrated. In this case, the cylindrical members and the stator yokes may be monolithically made of a soft, magnetic material. Thus, the numbers of the parts and assembling steps can be reduced.

Moreover, the bearing housing and the cylindrical members may be monolithically made of a soft, magnetic material such as a resin containing soft, magnetic powder, and the coil bobbin and the bearing housing may also be monolithically made of a soft, magnetic material. With this construction, the number of parts and assembling steps can be drastically reduced so that the cost can be accordingly dropped. In this case, the magnetic characteristics and the mechanical characteristics can be improved by fitting soft, magnetic cores in the cylindrical members.

Moreover, the shorting member may be exemplified by a plurality of soft, magnetic shorting rods. This construction allows no electric current in the circumferential direction to suppress the eddy current loss.

Furthermore, the total area of the shorting rods can be increased irrespective of the thickness of the stator yokes by arranging them in a necessary number so that the amount of saturation flux at that portion can be increased to improve the efficiency of the magnetic circuit.

Furthermore, the soft, magnetic shorting rods may be insert molded monolithically with the bobbin of the annular coil. Thus, the number of assembling steps can be reduced.

Furthermore, the bobbin of the annular coil and the bearing housing may be monolithically made of a synthetic resin.

Furthermore, the bobbin may be molded of a resin containing the powder of a soft, magnetic material. This molding can improve the magnetic characteristics.

The stator yokes or the cylindrical members may be formed with slits, notches or holes. This construction can suppress the eddy current and reduce the eddy current loss.

Moreover, the present invention can be applied to not only the outer-rotor type motor but also an inner-rotor type motor.

Still moreover, a plate of a magnetic material can be bent, for example, to form the magnetic elements thereon.

DESCRIPTION OF THE PREFERRED EMBODIMENTS

Figure 1:
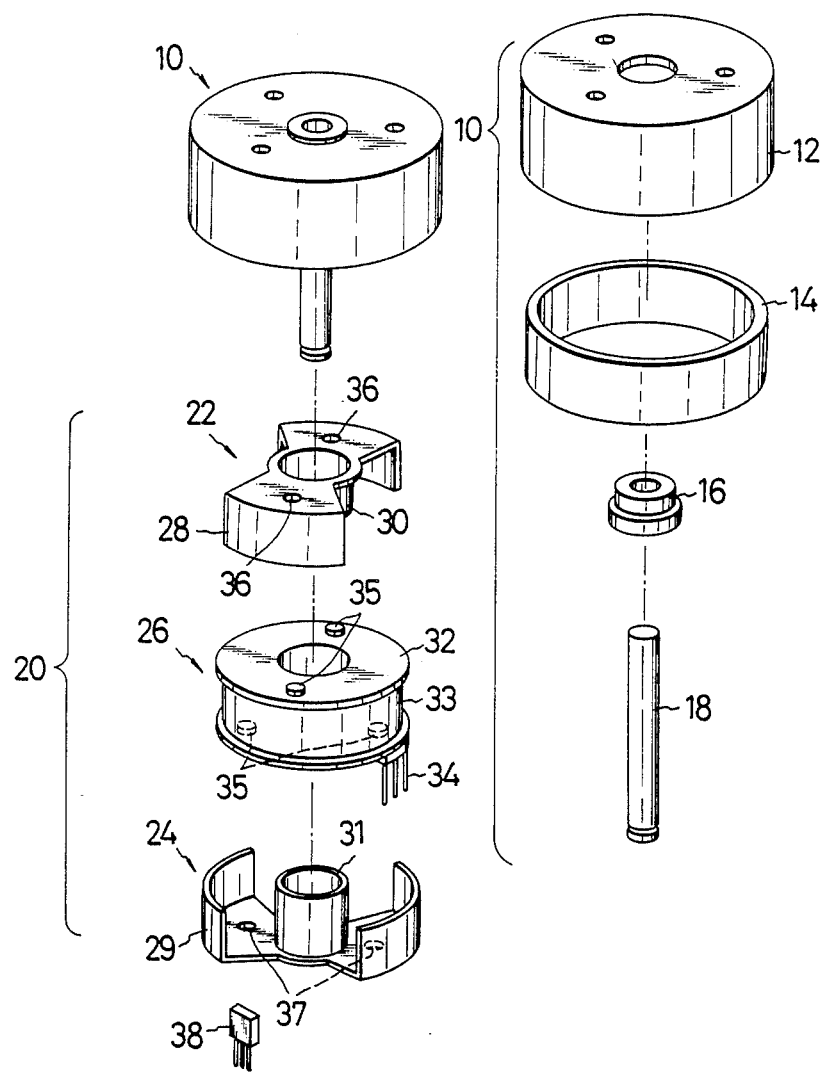
FIG. 1 is an exploded perspective view showing an essential portion of a brushless DC motor according to a first embodiment of the present invention.
Figure 2:
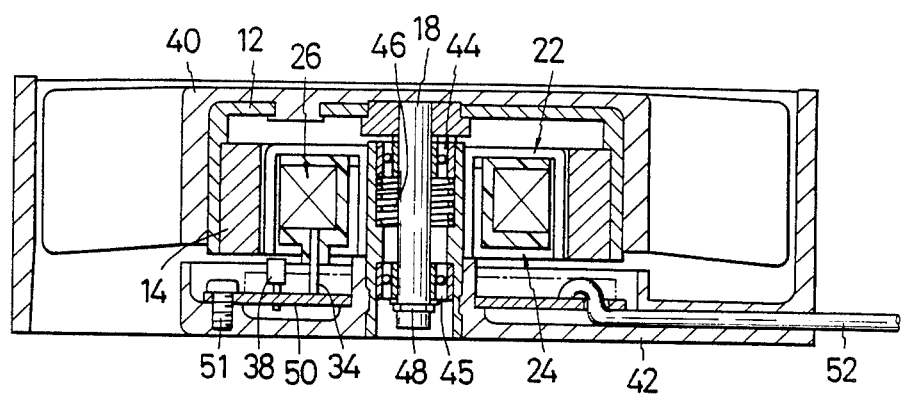
FIG. 2 is a section showing one example in case the brushless DC motor is applied to a fan.

FIGS. 1 to 4 are views showing an essential portion of a tetra-pole outer-rotor type brushless DC motor according to a first embodiment of the present invention.

A rotor 10 is constructed by adhering a rotor magnet 14 to the inner circumference of a cup-shaped rotor yoke 12 and by fitting a shaft in a bushing 16 fixed at the center. The rotor magnet 14 is a ring-shaped permanent magnet having four poles magnetized on its circumference. The rotor magnet 14 may naturally be made by combining a plurality of segments of permanent magnet.

On the other hand, a stator 20 is constructed by sandwiching an annular coil 26 between first and second stator yokes 22 and 24 which in turn are made by bending a ferromagnetic metal plate. Each of the first and second stator yokes 22 and 24 is constructed to have sectors extending radially oppositely from the center to the outer circumference to form magnetic members 28 or 29 and to have a ring 30 or 31 integrated with its inner circumference. The coil 26 is constructed by making a winding 33 on a bobbin 32 having a winding core formed with flanges at its two ends and by connecting the ends of the winding 33 with pin terminals 34.

Moreover, the first and second stator yokes 22 and 24 are assembled by causing the outer surfaces of their magnetic elements 28 and 29 to face the inner surface of the rotor magnet 14 and by fitting their one ring 31 in their other ring 30. The magnetic elements 28 and 29 are combined to establish a magnetic unbalance on the circumference to be formed with an air gap so that the spacial angle made by the two stator yokes 22 and 24 may be other than the right angle. These positionings and fixings are accomplished by fitting resin projections 35, which are formed on the two outer surfaces of the coil bobbin 32, in holes 36 and 37, which are formed in the two stator yokes 22 and 24, and by thermally caulking the resin projections 35.

A magnetic pole detector 38 such as a Hall element is attached to the vicinity of the rotor magnet 14. In other words, this magnetic pole detector 38 is desirably disposed in the vicinity of a point which is magnetically neutral when the first and second stator yokes 22 and 24 are excited.

Figure 3:
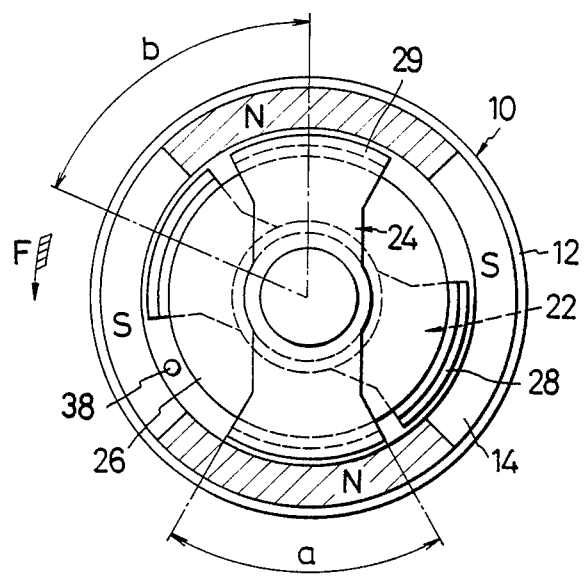
FIG. 3 is a diagram showing the operating principle of the motor.

The detail of the combined positions of the stator yoke and the rotor is shown in FIG. 3. It is desirable that the open angle a (facing the magnetic face of the rotor magnet 14) between the magnetic elements 28 and 29 of the first and second stator yokes 22 and 24 be within a range of one fifth to four fifths of a spacial angle expressing the magnetizing portion of one pole of the rotor magnet. Moreover, the smaller angle b of the spacial angle contained between the first and second stator yokes 22 and 24 is desired to be within a range of $\pi/4$ to $3\pi/4$ when it is expressed with the electrical angle.

On the other hand, the magnetic pole detector 38 is desired, when the first and second stator yokes 22 and 24 are combined with the above-specified relation, to be disposed in the vicinity of the magnetically neutral point when the stator yokes 22 and 24 are to be excited.

A fan motor utilizing the brushless DC motor having the fundamental structure described above is shown in section in FIG. 2. The portions corresponding to the aforementioned members are designated at the common reference numerals, and their descriptions will be omitted. The rotor yoke 12 is fitted and thermally caulked in an impeller (or vane wheel) 40 which is monolithically molded of a synthetic resin. The shaft 18 of the rotor 10 is rotatably borne by bearings 44 and 45 mounted in casing 42 and is held by an E-ring 48 while being biased by a spring 46. The stator 20 is mounted in the casing 42.

A circuit substrate 50 is fixed in the casing 42 by means of screws 51. On this circuit substrate 50, there are mounted a later-described coil excitation switching logic circuit, a switching element, the magnetic pole detector 38 and so on as well as the pin terminals 34 of the coil 26. The electric power necessary is supplied from the outside through a cord 52.

Figure 4:
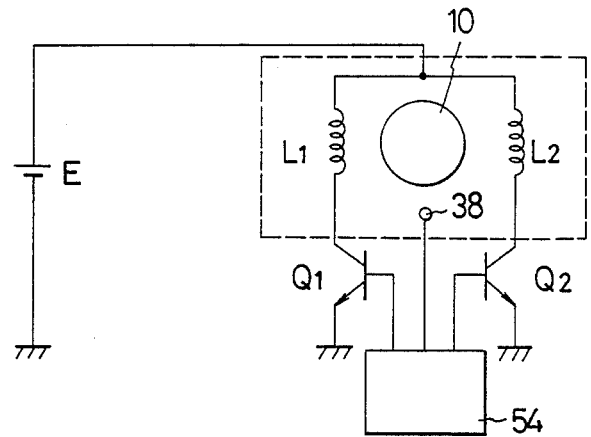
FIG. 4 is a circuit diagram showing one example of a driver for driving the brushless DC motor.

FIG. 4 is a circuit diagram showing one example of a driver for driving the brushless DC motor. Reference letters $L_1$ and $L_2$ designate coils of bifilar winding, which have their ends connected commonly with a DC power source E and their other ends connected with switching elements $Q_1$ and $Q_2$, respectively. Incidentally, the block designated at numeral 54 is the energization switching logic circuit.

The operations of the brushless DC motor thus constructed will be described in the following with reference to FIGS. 3 and 4. The rotor magnet 14 is radially magnetized with four poles, as has been described before. For convenience, the hatched portions appearing in FIG. 3 are magnetized at the N pole whereas the blank portions are magnetized at the S pole. The relations among the detected magnetic poles of the magnetic pole detector 38, the excited and unexcited states of the coils $L_1$ and $L_2$, and the excited polarities of the first and second stator yokes 22 and 24 corresponding to the coil excitations are enumerated in Table 1:

TABLE 1

| Position Numbers | (1) | (2) |
|---|---|---|
| Detected Polarities of Magnetic Pole Detector | S | N |
| Coils to be Excited | $L_1$ | $L_2$ |
| Polarities of 1st Stator Yoke upon Coil Excitations | S | N |
| Polarities of 2nd Stator Yoke upon Coil Excitations | N | S |

FIG. 3 corresponds to the position (1) of the Table 1. In this position, the magnetic attraction between the S poles of the first stator yoke 22 and the N pole of the rotor magnet 14 are dominant to rotate the rotor 10 counter-clockwise, as indicated by arrow F. When the rotor 10 rotates 90 degrees from the position shown in FIG. 3, i.e., at the instant when the magnetic pole detector 38 starts to detect the N pole of the rotor magnet 14, the excitation is switched from the coil $L_1$ to the coil $L_2$ to invite the position (2). This position is maintained for a time period from the instant when the magnetic pole detector 38 detects the N pole of the rotor magnet 14 to the instant when the same detects the S pole. As a result, the magnetic attraction between the N pole of the first stator yoke 22 and the S pole of the rotor magnet 14 become dominant to continue the counter-clockwise rotations of the rotor 10. When a further rotation of 180 degrees is made from the position of FIG. 3, the position (1) of the Table 1 is restored. Another rotation of 90 degrees (i.e,. 270 degrees from the position of FIG. 3 in the counter-clockwise direction) is made to restore the position (2) of the Table 1, thus completing one rotation.

Thus, the rotor 10 continues its smooth rotations in one direction (i.e., the counter-clockwise direction F in this embodiment) while repeating the positions (1) and (2) of the Table 1 each time it makes the rotation of 90 degrees.

The embodiment thus far described is directed to the case in which the rotor magnet 14 is of the tetra-pole outer-rotor type and in which the excitation is effected by the two-phase unipolar drive. However, the present invention can be applied to other structures. If the number of the magnetic poles of the rotor magnet 14 is 2n (wherein n: a positive integer), smooth rotations in one direction are accomplished while sequentially repeating the commutations according to the logic of the Table 1. Then, the angle of commutation is 180/n degrees (for example, 180/2=90 degrees for the four poles as in the foregoing embodiment, and 180/3=60 degrees for six poles). Thus, the motor characteristics highly depend upon the number of the magnetic poles of the rotor magnets. Assuming that the number of turns and resistances of the coils be equal, the motor is of high-speed and low-torque type for the smaller number of magnetic poles of the rotor magnets but of low-speed and high-torque type for the larger number.

In the motor having the structure of the present invention, from the standpoint of the magnetic circuit, the first and second stator yokes play important roles, and their shapes exert serious influences upon the motor characteristics (e.g., efficiencies).

Other examples of the first and second stator yokes are shown in FIGS. 5 to 11.

Figure 5:
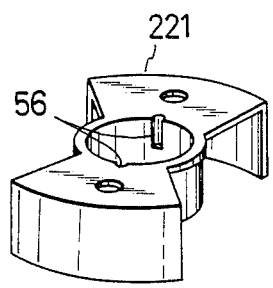
FIGS. 5 to 11 are perspective views showing a stator yoke suitable for use in the present invention.

As shown in FIG. 5, a first stator yoke 221 is formed with at least one slit 56 in its cylindrical portion (i.e., a shorting portion between a magnetic flux passing through the first stator yoke and a magnetic flux passing through the second stator yoke). This slit 56 is effective for reducing the Joule loss (or eddy current loss) due to the eddy current to be generated in the cylindrical portion. The slit 56 is very effective especially in a motor rotating at a high speed.

Figure 6:
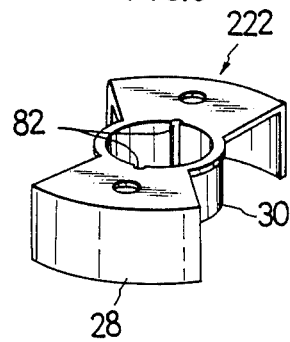

On the other hand, a first stator yoke 222 shown in FIG. 6 is formed with slits 82 extending from the upper to lower ends of the cylindrical portion 30. These slits 82 are also effective for reducing the eddy current loss like the aforementioned stator yoke 221.

Figure 7:
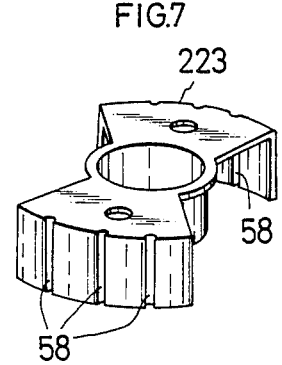

A first stator yoke 223 shown in FIG. 7 is formed with at least one slit 58 in its magnetic element for reducing the eddy current loss to be generated in the magnetic element. Incidentally, the magnetic element may be cut at its central portion or notched radially. Similar effects can be obtained if both the cylindrical portion and magnetic elements of the stator yoke are slitted, notched or holed.

Figure 8:
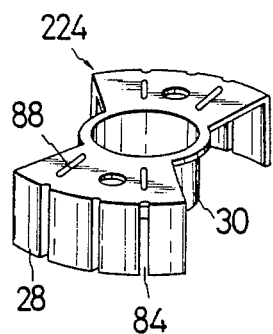
Figure 9:
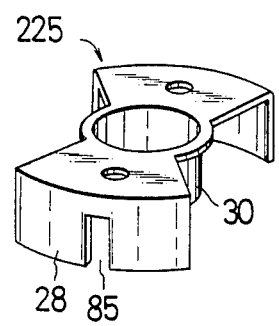
Figure 10:
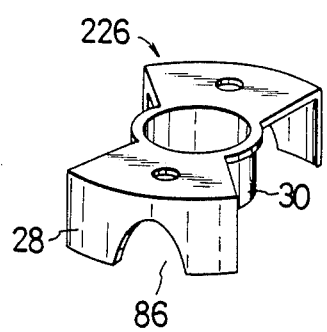

A first stator yoke 224 shown in FIG. 8 is formed with three axially extending slits 84 in its magnetic elements 28. The stator yoke 224 is further formed in its sectors with radially extending slots 88. A first stator yoke 225 shown in FIG. 9 is formed with one rectangular notch 85 at its center. As shown in FIG. 10, a first stator 226 may be formed with a larger parabolic notch 86 at its center. The size of the notch 86 is set at a suitable area if an excessively large notch is detrimental to the functions of the magnetic elements.

Figure 11:
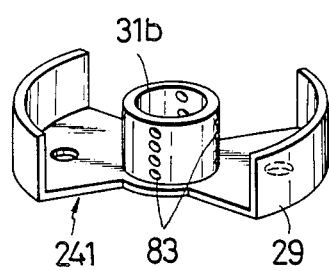

There may be used a second stator yoke 241, as shown in FIG. 11. This second stator yoke 241 is formed with a number of holes 83 in its cylindrical portion 31b with a number of which are arrayed in the axial direction. In this example, the holes 83 are arrayed axially symmetrically in four rows. The second stator yoke 241 thus constructed can suppress generation of the eddy current like the first stator yokes 221 to 226.

Incidentally, the aforementioned shaping effects of the first and second stator yokes are alive irrespective of the drive type or the number of the magnetic poles of the rotor magnets.

Figure 12:
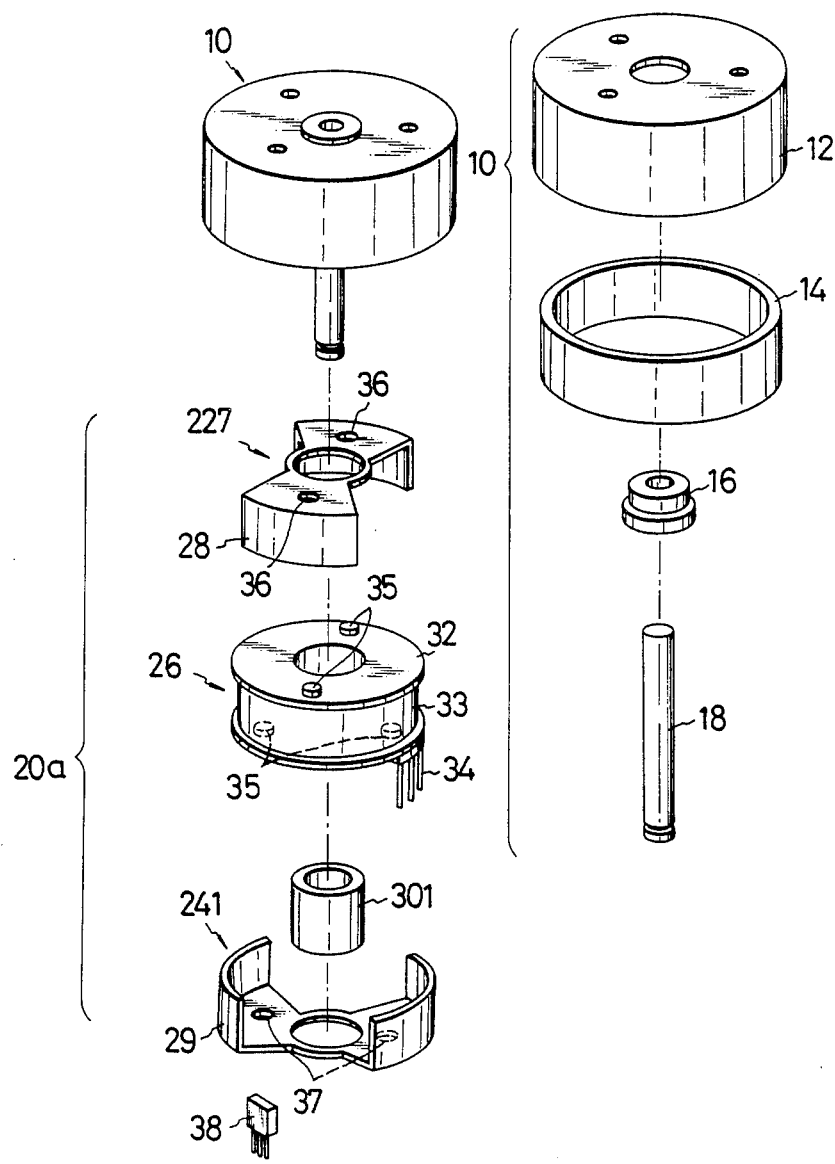
FIG. 12 is an exploded perspective view showing an essential portion of a brushless DC motor according to a second embodiment of the present invention.

FIG. 12 is an exploded perspective view showing an essential portion of a tetra-pole outer-rotor type brushless DC motor according to a second embodiment of the present invention.

As shown in FIG. 12, a stator 20a is constructed of first and second yoke plates 227 and 241 which are made by bending the outer circumference of a soft, magnetic metal plate; and a soft, magnetic shorting ring member 301 for magnetically shorting the two yoke plates 227 and 241. The circular coil 26 is sandwiched between the two yoke plates 227 and 241.

The present embodiment is characterized, as described above, in that the stator yoke is constructed of three components: the two yoke plates 227 and 241 and the one shorting ring member 301 sandwiched therebetween. The remaining portions are shared with the foregoing first embodiment.

The first and second yoke plates 227 and 241 are formed at their respective centers with fitting holes and are made by bending the magnetic elements 28 and 29 to the outer circumferences like the foregoing first and second stator yokes 22 and 24. The first and second stator yoke plates 227 and 241 can be easily made by pressing them. The shorting ring member 301 may be any such as a metal or a sintered material if they are made of a soft, magnetic material, but may be moldings of a resin containing soft, magnetic powder, because they can be easily molded into a complicated shape.

The first and second yoke plates 227 and 241 are joined with the shorting ring member 301. These positionings and fixings are accomplished by fitting the resin projections 35, which are formed on the outer surfaces of the coil bobbin 32, in the holes 36 and 37 formed in the two yoke plates 227 and 241, respectively, and by thermally caulking the resin projections.

Since the stator 20a is constructed by making the shorting ring member 301 separately from the yoke plates 227 and 241, no deep drawing is required for making the yoke plates 227 and 241 to facilitate the pressing step so that the parts can be made highly precise. Moreover, the two yoke plates 227 and 241 can be made into an identical shape. Then, a common mold can be used to reduce the cost therefor.

Since, moreover, the yoke plates and the coil bobbin can be positioned and fixed by the thermal caulking, the assembly can be automated while facilitating the handling of the parts.

Figure 13:
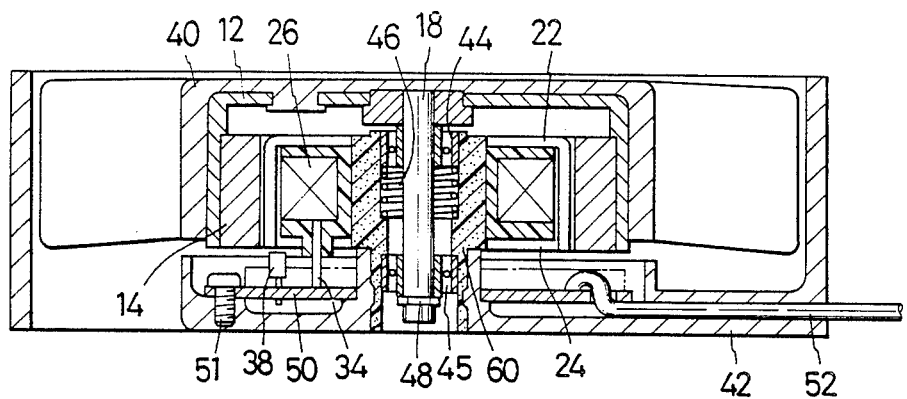
FIG. 13 is a section showing a brushless DC motor according to a third embodiment of the present invention.

FIG. 13 shows a third embodiment of the present invention. The portions corresponding to the individual members of the foregoing first embodiment are designated at the common reference numerals.

Figure 14:
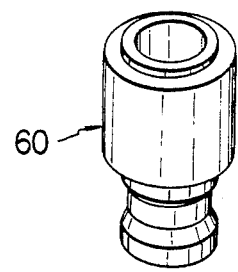
FIG. 14 is a perspective view showing a shorting ring member of the same.

In this embodiment, there is used a bearing housing integrated type shorting ring member 60 (as shown in FIG. 14), in which the shorting ring portion and the bearing housing portion are integrated. This shorting ring member 60 is made of a soft, magnetic material. With this construction, the cross-sectional area of the magnetic path of the shorting ring portion can be enlarged to invite an advantage in the magnetic characteristics and to reduce the number of parts. Incidentally, the bearing housing portion of the prior art is made of nonmagnetic brass and is fitted in the ring portion of the stator yoke, as has been described hereinbefore.

Figure 15:
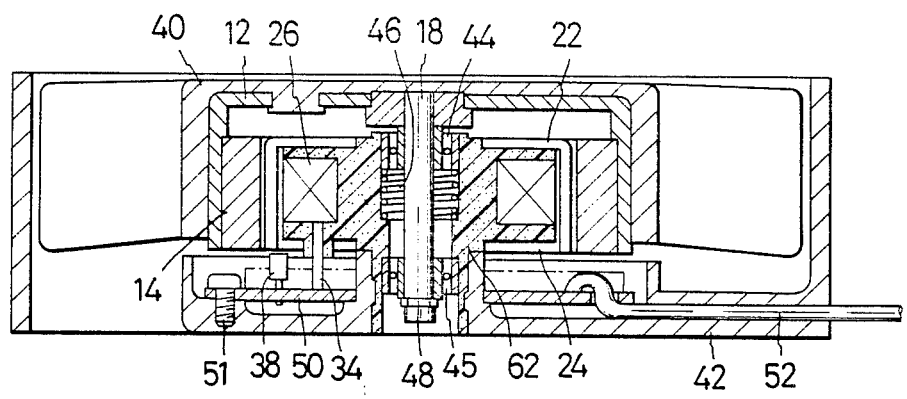
FIG. 15 is a section showing a fourth embodiment of the present invention.
Figure 16:
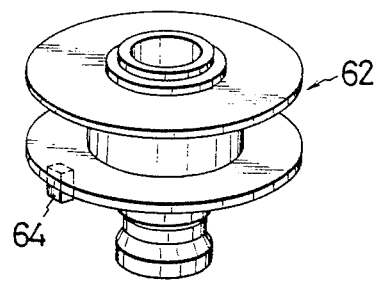
FIG. 16 is a perspective view showing a shorting ring member of the same.

FIG. 15 shows a fourth embodiment of the present invention. This embodiment is characterized, as shown in FIG. 16, by using a bobbin - bearing housing integrated type shorting ring member 62 in which not only the shorting ring portion and the bearing housing portion but also the coil bobbin portion are integrated. This shorting ring member 62 is made by monolithically molding a resin containing powder of soft, magnetic material into a predetermined shape. With this construction, a separate part such as the bobbin can be dispensed with, and the magnetic cross-sectional area of the yoke portion can be further increased to improve the motor characteristics. If, in this case, a drive fitting base 64 for drive fitting the pin terminals of the wiring terminals of the coil is molded together, the binding and connecting works of the winding terminals can be additionally simplified.

Figure 17:
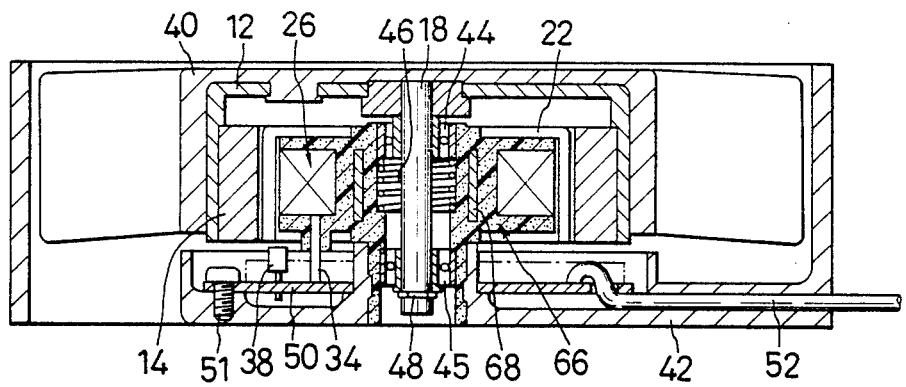
FIG. 17 is a section showing a fifth embodiment of the present invention.

FIG. 17 shows a fifth embodiment, which uses a shorting ring member 66 having its bobbin, bearing housing and shorting member integrated. A soft, magnetic core 68 is fitted in the inner circumference of the shorting ring member 66 to improve the magnetic characteristics and the mechanical strength. The soft, magnetic core 68 may be made of sintered ferrite. The shorting ring member 66 thus constructed can be easily manufactured by insert molding.

Figure 18:
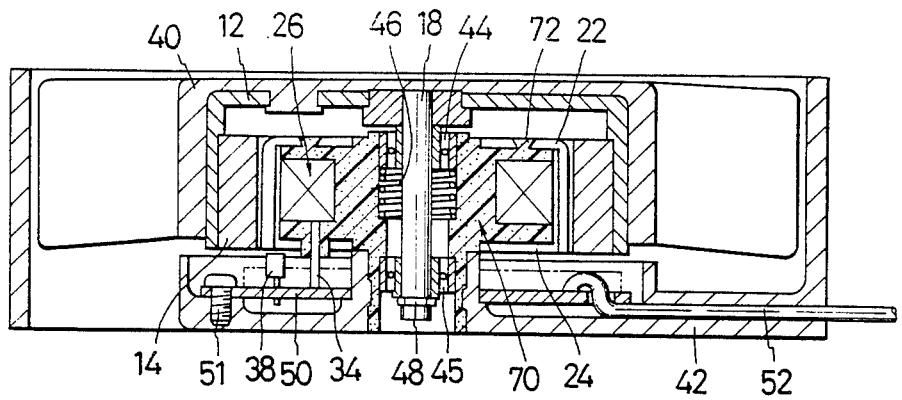
FIG. 18 is a section showing a sixth embodiment of the present invention.
Figure 19:
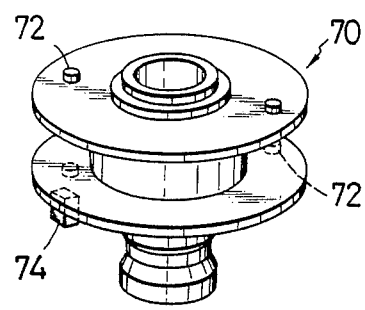
FIG. 19 is a perspective view showing a shorting ring member of the same.

FIG. 18 shows a sixth embodiment, in which a bobbin - bearing housing portion integrated type shorting ring member 70 of a resin molding is formed in advance with yoke plate fixing projections so that the shorting ring member 70 and the yoke plates can be fixed by the thermal caulking. As shown in FIG. 19, more specifically, the shorting ring member 70 has its bottom formed on its two outer sides with two projections 72, which are fitted in the holes 36 and 37 of the yoke plates 227 and 241 and are thermally deformed and fixed. Incidentally, reference numeral 74 designates a drive fitting base for drive fitting the pin terminals.

In FIGS. 15, 17 and 18, the brushless DC motor can be rotated continuously and smoothly in one direction by detecting the magnetic poles of the rotor magnets with the magnetic pole detector 38 and by accordingly controlling the excited and unexcited states of the coil.

Figure 20:
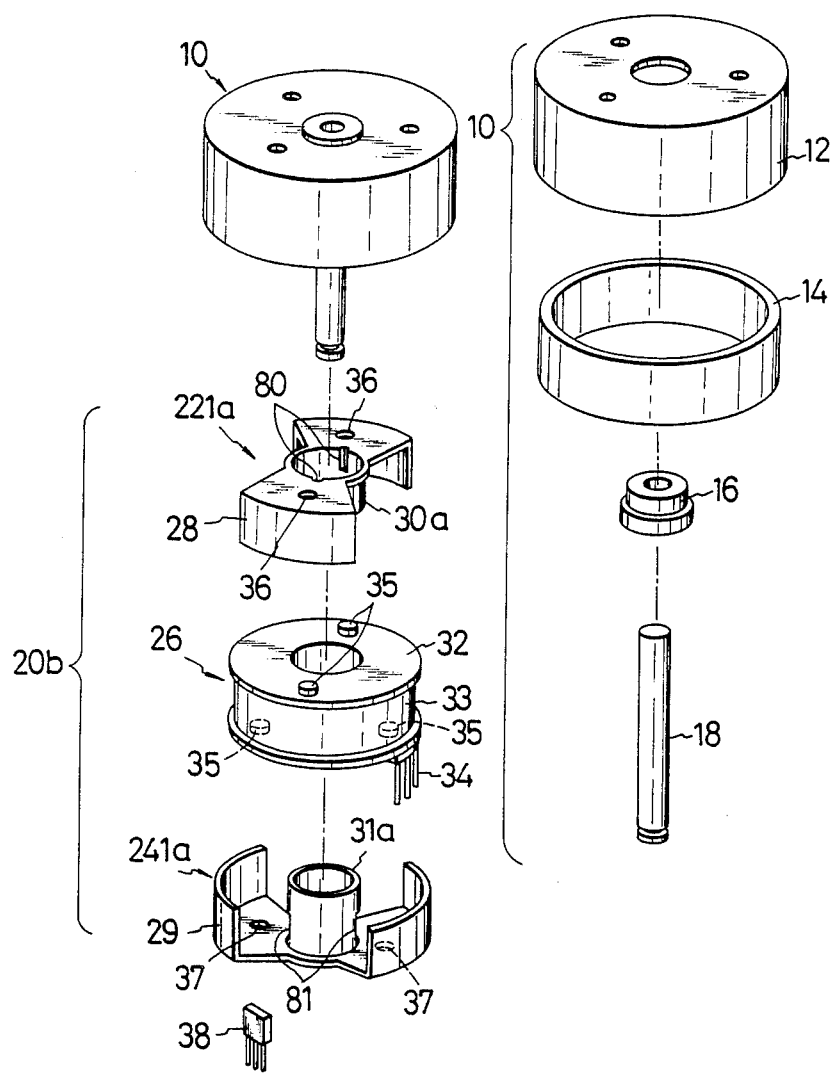
FIG. 20 is an exploded perspective view showing a brushless DC motor according to a seventh embodiment of the present invention.

FIG. 20 is an exploded perspective view showing an essential portion of a tetra-pole outer-rotor type brushless DC motor according to a seventh embodiment of the present invention.

As shown in FIG. 20, a stator 20b is constructed by sandwiching the annular coil 26 between first and second stator yokes 221a and 241a which are made by bending the outer circumferences of soft, magnetic plates. Here, the first and second stator yokes 221a and 241a are extended radially outward in the form of a sector from their respective centers to form the magnetic elements 28 and 29 at the outer circumferences and cylindrical portions 30a and 31a at the inner circumferences.

This embodiment is characterized in that the two stator yokes 221a and 241a are formed in their cylindrical portions 30a and 31a with axially extending slits 80 and 81. Two slits 80 and 81 are arrayed symmetrically with respect to the center axis.

In the brushless DC motor according to this embodiment, axially changing magnetic fluxes are established in the cylindrical portions 30a and 31a of the stator yokes 221a and 241a by energizing the coil 26. As a result, an eddy current will be established in the circumferential directions in the cylindrical portions 30a and 31a. Since, however, the cylindrical portions 30a and 31a are formed with the slits 80 and 81, an electric resistance in the circumferential direction is so high that it can suppress the eddy current to reduce the eddy current loss.

In the seventh embodiment described above, the cylindrical portions are monolithically press-molded with the stator yokes so that the two stator yokes have their cylindrical portions fitted one in the other. However, the cylindrical portions may be made of a soft, magnetic material separately of the two stator yokes, and the two stator yokes and the one cylindrical portion may be joined to sandwich the coil inbetween.

Figure 21:
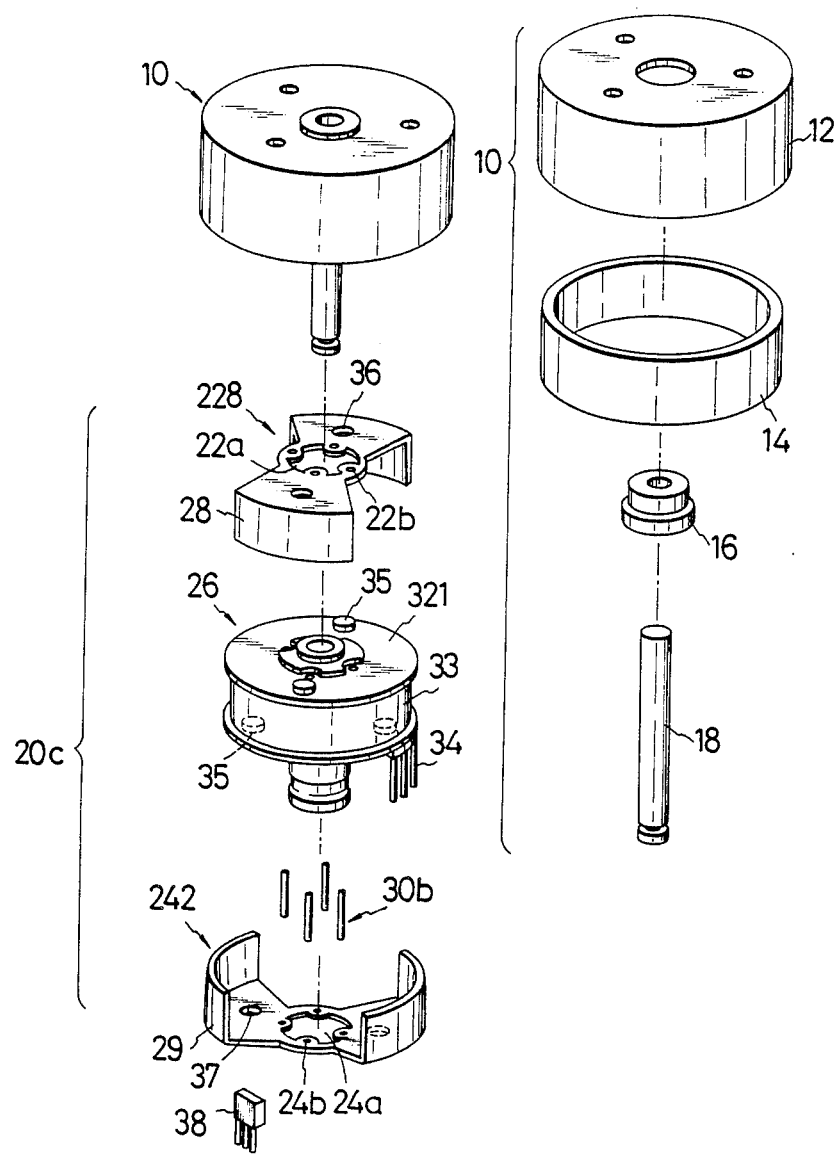
FIG. 21 is an exploded perspective view showing a brushless DC motor according to an eighth embodiment of the present invention.

FIG. 21 is an exploded perspective view showing an essential portion of a tetra-pole outer-rotor type brushless DC motor according to an eighth embodiment of the present invention.

As shown, a stator 20C is constructed of: first and second yoke plates 228 and 242 which are made by bending the outer circumferences of soft, magnetic metal plates; a plurality of (or four in the present embodiment) soft, magnetic shorting rods 30b for magnetically shorting the two yoke plates 228 and 242 in the axial direction; and the annular coil 26 sandwiched between the two yoke plates 228 and 242.

These first and second yoke plates 228 and 242 are formed at their respective centers with fitting holes 22a and 24a and are extended radially outward from their respective centers in the form of a sector and are bent at their outer circumferences to form the magnetic elements 28 and 29. This structure is easily made by the pressing. The shorting rods 30b are made of a soft, magnetic material and are arranged four in number symmetrically and in parallel with the axis in the present embodiment. Here, the cross-sectional areas and number of the shorting rods 30b are suitably selected in accordance with the density of the magnetic flux on the magnetic circuit. The fixings of the first and second yoke plates 228 and 242 and the shorting rods 30b may be accomplished by forming fitting holes 22b and 24b in corresponding portions of those yoke plates 22 and 24 and by fitting the two ends of each shorting rod 30b in the corresponding fitting holes 22b and 24b and press-caulking or electric (or spot) welding them.

The coil 26 is constructed by making the winding 33 on a bobbin 321 having its core formed at its two ends with flanges like the foregoing individual embodiments and by binding the terminals of the winding to the pin terminals 34. In this case, the coil 26 may desirably be constructed by insert molding the soft, magnetic shorting rods 30b monolithically with the bobbin 321.

The first and second yoke plates 228 and 242 are combined such that their magnetic elements 28 and 29 have their outer circumferencs facing the inner circumference of the rotor magnet 14 to form an air gap nd to establish a magnetic unbalance on the circumference (that is, the spacial angle contained by the two stator yokes is other than a right angle), and are joined by the soft, magnetic shorting rods 30b. These positionings and fixings are accomplished by fitting the resin projections 35, which are formed on the respective outer surfaces of the bobbin 321, in the holes 36 and 37 formed in the two yoke plates 228 and 242 and by thermally caulking the resin projections 35.

The characteristics of the eighth embodiment reside in the stator magnetic circuit, i.e., in the construction that the stator yokes magnetically short the two yoke plates 228 and 242 in the axial direction through the plural soft, magnetic shorting rods 30b. This structure reduces the eddy current which is generated by the axially changing magnetic field, to improve the motor efficiency. Incidentally, the material, cross-sectional area and number of the shorting rods 30b are suitably selected not to cause magnetic saturation thereat.

Figure 22:
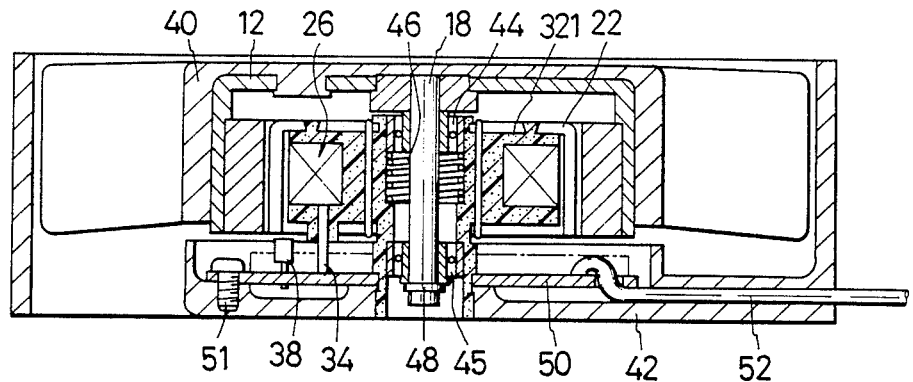
FIG. 22 is a section showing a brushless DC motor according a ninth embodiment of the present invention.
Figure 23:
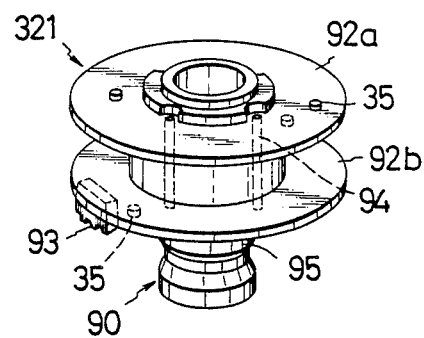
FIG. 23 is a perspective view showing a bobbin to be used in the ninth embodiment.

FIGS. 22 and 23 show a ninth embodiment of the present invention. FIG. 22 is a section showing a brushless DC motor which is applied to a fan, and FIG. 23 is a perspective view showing the bobbin 321 used in the DC motor. The portions corresponding to the foregoing individual members are designated at the common numerals, and their explanations will be omitted.

In this embodiment, as shown in FIG. 23, there is used the resin bobbin 321 which has a bearing housing portion molded monolithically therewith. This bobbin 321 is constructed of: a cylindrical portion 90; and two flange portions 92a and 92b which extend outward from the outer circumference of the cylindrical portion 90 in parallel with each other. The bobbin 321 thus constructed is equipped with the winding between the two flange portions 92a and 92b. These upper and lower flange portions 92a and 92b are formed on their outer surfaces with the projections 35 for positioning and fixing the two yoke plates 228 and 242. The lower flange portion 92b is equipped on its lower surface with a pin terminal bed 93. Moreover, the cylindrical portion 90 is formed in its wall with four shorting rod holes 94 extending therethrough and on its inner circumference with a bearing housing. The cylindrical portion 90 is further formed partially in its outer circumference with a positioning flange 95 for positioning the circuit substrate 50.

Since the resin bobbin 321 can be precisely molded even with a complicated shape, the aforementioned individual portions can be monolithically molded to facilitate the motor assembly.

Incidentally, in the ninth embodiment thus constructed, there is used one stator which has the two yoke plates, the one coil and the plural shorting rods for magnetically shorting the two yoke plates in the axial direction. The present invention can be applied to a motor which is constructed by disposing a plurality of such stators in the axial direction.

Figure 24:
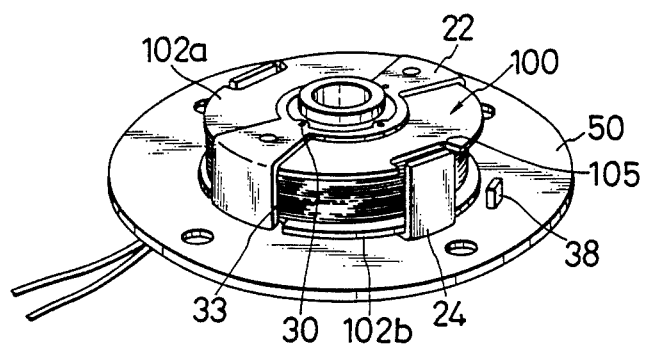
FIG. 24 is a perspective view showing a ninth embodiment of the present invention.
Figure 25:
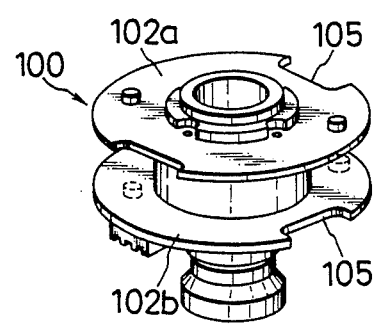
FIG. 25 is a perspective view showing a bobbin to be used in the tenth embodiment.

FIGS. 24 and 25 show a tenth embodiment of the present invention. The stator shown in FIGS. 24 and 25 uses a bobbin 100 in place of the aforementioned bobbin 321. The bobbin 100 has its flange portions 102a and 102b formed with notches 105 which are located in the vicinity of the leading ends of the magnetic elements of the mating yoke plates. These notches 105 are provided for the following reasons. Without the notches 105, the upper and lower flanges of the bobbin 100 are magnetically shorted directly by the magnetic elements 28 and 29, when the two yoke plates 228 and 242 are combined, so that their effects are substantially reduced depending upon the sizing relations.

The bobbin 100 may be made of a nonmagnetic material but may desirably be made of a soft, magnetic resin containing the powder of a soft, magnetic material so as to improve the characteristics. The use of this soft, magnetic resin will drop the magnetic resistance to raise an advantage that the motor characteristics are improved.

Incidentally, the embodiments thus far described are directed to the tetra-pole outer-rotor type, but the present invention can be practised irrespective the number of poles and applied to the inner-rotor type.

Figure 26:
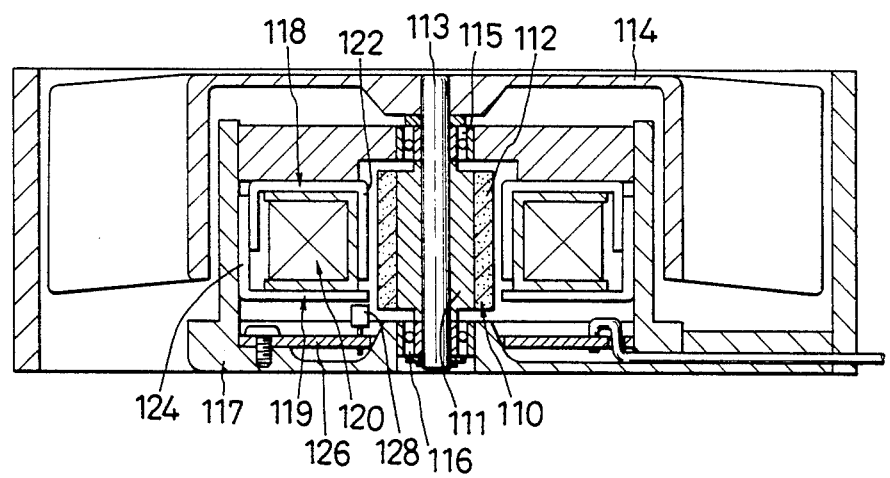
FIG. 26 is a section showing a brushless DC motor according to an eleventh embodiment of the present invention.

This inner-rotor type is exemplified in an eleventh embodiment, as shown in FIG. 26. The fundamental concept is shared with the case of the foregoing outer-rotor type. A rotor 110 is constructed by fixing a rotor magnet 112 on a shaft 113 by a ring 111 of aluminum. An impeller 114 is attached to the end portion of the shaft 113. This shaft 113 is rotatably borne by bearings 115 and 116 in a manner to rotate with respect to a casing 117. The stator is constructed by sandwiching an annular coil 120 between a first stator yoke 118 and a second stator yoke 119. A magnetic element 122 is so formed at the inner circumferential side of the stator yokes as to face the rotor magnet 112, and a ring 124 is disposed at the outer circumferential side to continue the magnetic path. In the casing 117, there is mounted a circuit substrate 126, on which are mounted a magnetic pole detector 128 and other necessary circuits. Incidentally, the rotor structure should not be limited to the aforementioned one but may be modified such that the rotor magnet and the shaft are monolithically molded of a resin.

The operations of the fan motor thus constructed are basically similar to those of the case of the outer-rotor type, and their explanations will be omitted.

This inner-rotor type can attain an effect to reduce the eddy current loss similar to that of the outer-rotor type, if the stator yokes have their magnetic elements or rings formed with slits or notches.

What is claimed is:

1. A brushless DC motor having an outer rotor comprising:
   a plurality of magnetic poles disposed in the rotating direction on an inner surface of the rotor, said rotor being mounted rotatably in a bearing housing,
   a stator disposed coaxially with the rotor and inside of the magnetic poles so as to maintain an even air gap between the stator and the magnetic poles for generating a magnetic field which drives the magnetic poles of the rotor when an electric current is fed to an annular coil of the stator; and
   a magnetic pole detector for detecting the positions of the magnetic poles of said rotor to control the electric current to be fed to said stator,
   wherein said stator includes:
   a bobbin provided coaxially with the rotor and wound with the annular coil for passing the electric current therethrough; and
   two stator yokes made of a magnetic material, each having magnetic elements, made by bending magnetic metal plates, in a number half as many as that of the magnetic poles of said rotor, said stator yokes being arranged to face each other at their magnetic element forming sides through said annular coil, said magnetic elements being so combined with each other as to establish a magnetic unbalance in said air gap with respect to the magnetic poles of said rotor and being magnetically shorted through a shorting member.

2. A brushless DC motor according to claim 1, wherein said stator yokes are made of a ferromagnetic material.

3. A brushless DC motor according to claim 1, wherein said stator yokes are made of a soft, magnetic material.

4. A brushless DC motor according to claim 1, wherein said shorting member is a cylindrical member.

5. A brushless DC motor according to claim 4, wherein said cylindrical member is formed with notches, slits or holes for suppressing an eddy current.

6. A brushless DC motor according to claim 4, wherein said cylindrical member is made of a soft, magnetic material.

7. A brushless DC motor according to claim 1, wherein said shorting member is a cylindrical member, and said cylindrical member and said stator yokes are monolithically made of a soft, magnetic material.

8. A brushless DC motor according to claim 7, wherein said soft, magnetic material is a resin containing soft, magnetic powder.

9. A brushless DC motor according to claim 1, wherein the bobbin of said annular coil and the bearing housing of said rotor are monolithically made of a soft, magnetic material.

10. A brushless DC motor according to claim 9, wherein said soft, magnetic material is a resin containing soft, magnetic powder.

11. A brushless DC motor according to claim 1, wherein the bobbin of said annular coil is made of a synthetic resin.

12. A brushless DC motor according to claim 1, wherein said stator yokes and the bobbin of said annular coil are formed with holes and projections which can engage with each other.

13. A brushless DC motor according to claim 1, wherein said shorting member is a plurality of soft, magnetic shorting rods.

14. A brushless DC motor according to claim 13, wherein said soft, magnetic shorting rods are monolithically insert molded with the bobbin of said annular coil.

15. A brushless DC motor according to claim 1, wherein said stator yokes are formed with notches for suppressing an eddy current.

16. A brushless DC motor according to claim 1, wherein said stator yokes are formed with slits for suppressing an eddy current.

17. A brushless DC motor according to claim 1, wherein said shorting member is a cylindrical member, and said cylindrical member and the bearing housing of said rot monolithically made of a soft, magnetic material.

18. A brushless DC motor according to claim 17, wherein said soft, magnetic material is a resin containing soft, magnetic powder.

19. A brushless DC motor according to claim 1, wherein said stator yokes are formed with holes for suppressing an eddy current.

20. A brushless DC motor having an outer rotor comprising:
   a plurality of magnetic poles disposed in the rotating direction on an inner surface of the rotor, said rotor being mounted rotatably in a bearing housing,
   a stator disposed coaxially with the rotor and inside of the magnetic poles so as to maintain an even air gap between the stator and the magnetic poles for generating a magnetic field which drives the magnetic poles of the rotor when an electric current is fed to an annular coil of the stator; and
   a magnetic pole detector for detecting the positions of the magnetic poles of said rotor to control the electric current to be fed to said stator,
   wherein said stator includes:
   a bobbin provided coaxially with the rotor and wound with the annular coil for passing the electric current therethrough; and
   two stator yokes made of a magnetic material, each having magnetic elements in a number half as many as that of the magnetic poles of said rotor, said stator yokes being arranged to face each other at their magnetic element forming sides through said annular coil, said magnetic elements being so combined with each other as to establish a magnetic unbalance in said air gap with respect to the magnetic poles of said rotor and being magnetically shorted through a shorting member.

* * * * *